United States Patent
Hickman

(10) Patent No.: US 7,786,392 B2
(45) Date of Patent: Aug. 31, 2010

(54) SELF-CLEANING PRESSURE SWITCH WITH A SELF-SEALING DIAPHRAGM

(75) Inventor: Ron Hickman, Sherman, IL (US)

(73) Assignee: Honeywell International Inc., Morristown, NJ (US)

(*) Notice: Subject to any disclaimer, the term of this patent is extended or adjusted under 35 U.S.C. 154(b) by 360 days.

(21) Appl. No.: 12/049,891

(22) Filed: Mar. 17, 2008

(65) Prior Publication Data

US 2009/0229964 A1   Sep. 17, 2009

(51) Int. Cl.
    *H01H 35/34*   (2006.01)
(52) U.S. Cl. .................. 200/83 R; 200/241
(58) Field of Classification Search .......... 200/DIG. 42, 200/83 R, 241, 83 P, 83 A, 302, 537–538
    See application file for complete search history.

(56) References Cited

U.S. PATENT DOCUMENTS

| | | | | |
|---|---|---|---|---|
| 3,109,908 A | * | 11/1963 | Clason | 200/83 J |
| 4,049,935 A | | 9/1977 | Gruber | 200/83 |
| 4,736,990 A | | 4/1988 | Brown et al. | 303/84 A |
| 5,431,215 A | | 7/1995 | Davis | 165/11.1 |
| 5,604,338 A | * | 2/1997 | Paxton et al. | 200/83 N |
| 5,667,060 A | * | 9/1997 | Luzzi | 200/302.1 |
| 6,255,609 B1 | * | 7/2001 | Samuelson et al. | 200/83 L |
| 6,388,299 B1 | | 5/2002 | Kang et al. | 257/415 |
| 6,867,383 B1 | * | 3/2005 | Currier | 200/83 R |
| 7,256,361 B1 | | 8/2007 | Lee | 200/83 R |
| 7,297,885 B2 | | 11/2007 | Lee | 200/83 R |
| 2007/0045091 A1 | | 3/2007 | Lee | 200/83 R |
| 2007/0205777 A1 | | 9/2007 | Walter | 324/691 |
| 2007/0235302 A1 | | 10/2007 | Severson et al. | 200/83 J |

* cited by examiner

*Primary Examiner*—Edwin A. Leon
(74) *Attorney, Agent, or Firm*—Ingrassia Fisher & Lorenz, P.C.

(57) ABSTRACT

An improved pressure switch comprises a cover assembly, a pair of electrical terminals, a spring, a contact disk, a diaphragm and a banjo housing. The pair of electrical terminals can be partially covered by the cover assembly and the spring can be placed within the cover assembly. The contact disk can tightly be connected with the diaphragm and arranged on top of the spring. When the pressure exceeds a preset pressure level, the diaphragm can be deflected down onto the contact disk, which compresses the spring to contact the terminals. The terminals can be activated for energizing, for example, a hydraulic circuit if the contact disk contacts the terminals. Therefore, the disk can bias itself when the disk makes contact on the top of the terminals, which creates a movement of the disk to provide a self cleaning feature.

20 Claims, 8 Drawing Sheets

SELF-CLEANING PRESSURE SWITCH WITH A SELF-SEALING DIAPHRAGM

TECHNICAL FIELD

Embodiments are generally related to pressure switches and diaphragm components utilized in pressure sensors. Embodiments are also related to self-cleaning pressure switches.

BACKGROUND OF THE INVENTION

In general, switches are utilized to switch devices from an open/off position to a closed/on position in order to control the operation of particular devices and/or systems. Normally, mechanical switches are actuated to control an operation, especially in hydraulic devices such as, for example, automotive systems. Mechanical switches can be furnished in different sizes. Such switches are typically, however, not very compact and are very expensive and often require additional hardware for mounting.

A pressure switch is a type of switch in which the switching action can be triggered by a pressure in the surrounding environment. In some situations, pressure switches may be connected between the primary and secondary hydraulic circuits or between one of the hydraulic circuits and a booster circuit. Such pressure switches provide a reliable indication of pressure while simultaneously obviating switch actuation caused by excess pressures. In one prior art implementation, the pressure switch can be operatively engaged by a differential piston to actuate in response to movement thereof. The differential piston includes two piston elements telescopically engaged one within the other and maintained in an extended relationship by means of a preload spring. The piston elements are collapsible one within the other when the pressure is above a predetermined minimum pressure, which damages the entire pressure switch.

Another conventional pressure switch includes the use of a push member, two contact points, a spring member and a rectangular box, which receives all the parts therein. Such a pressure switch may improve the switching operation for hydraulic devices, for example, but increases the manufacturing cost. Similarly, the majority of prior art pressure switches can typically be configured with a diaphragm to be impinged upon by a pressure media such as air or gas under pressure. The diaphragm may actuate the switch contacts of the pressure switch upon reaching a predetermined pressure. These pressure switches, however, tend to operate only at relatively low pressure levels, and are not sufficiently miniaturized, since they frequently occupy more space. Additionally, such pressure switches are affected by surrounding dust, which tends to damage the diaphragm, which is not properly sealed.

A need therefore exists for a low cost, self-cleaning pressure switch, which can be mounted in line to an existing device or components such as a hydraulic circuit without any additional hardware. It is believed that such an improved pressures switch would find particular usefulness in automotive systems, such as, for example, anti-lock braking systems, sports utility vehicles, snowmobiles, all terrain vehicles (ATV's) and so forth.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the present invention to provide for a low cost, self cleaning pressure switch apparatus utilized in the context of hydraulic circuits of automotive systems.

It is another aspect of the present invention to provide for an improved pressure switch apparatus that can be utilized in specialized automotive systems, such as, for example, sports vehicles, including ATV's, motorcycle, snowmobiles, and so forth.

The aforementioned aspects and other objectives and advantages can now be achieved as described herein. An improved pressure switch comprises a cover assembly, a pair of electrical terminals, a spring, a contact disk, a diaphragm and a banjo housing. The pair of electrical terminals can be partially covered by the cover assembly, and the spring can be placed within the cover assembly. The contact disk can tightly be connected with the diaphragm and arranged on top of the spring. When the pressure exceeds a preset pressure level, the diaphragm can be deflected down onto the contact disk, which compresses the spring to contact the terminals. The terminals can be activated for energizing a hydraulic circuit if the contact disk contacts the terminals. Therefore, the disk can bias itself when the disk makes contact on the top of the terminals, which creates a movement of the disk to provide a self cleaning feature.

Furthermore, the spring, the contact disk and the diaphragm can be completely covered by the banjo housing. The banjo housing includes a through hole and a central hollow tube, which provides a passage for pressure media, such as, for example air or gas under pressure. The central hollow tube can be displaced over the diaphragm in such a way that the pressure media directly touches the diaphragm. The diaphragm and the contact disk can return to its original position, if the pressure reaches the preset pressure level.

In addition, the terminals are offset from the center of the switch by 0.015 inch. The movement of the contact disk can be configured at each time it makes contact with the terminals. The pressure switch can be directly mounted in line to the hydraulic circuit of an automobile brake system. The pressure switch includes less moving parts and self cleaning contacts which reduce the production cost. The pressure switch is self cleanable and versatile in nature. The pressure switch can be mounted in almost any system without using any additional hardware.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

Figure 1:
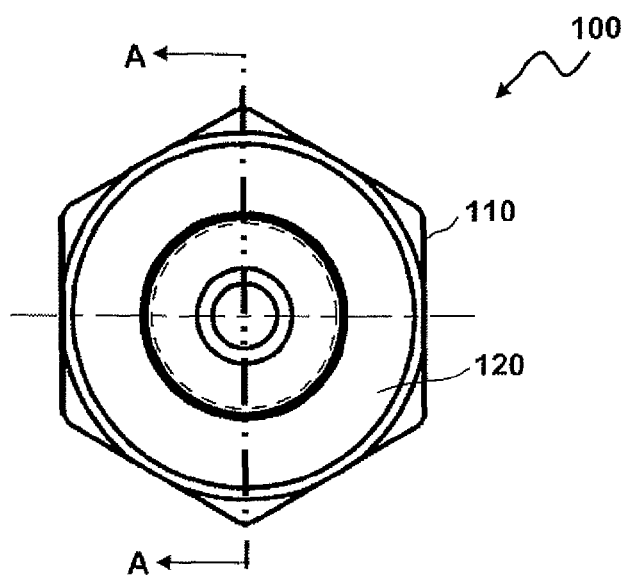
FIG. 1 illustrates a top plan view of a pressure switch, in which embodiments of the present invention may be implemented.
Figure 3:
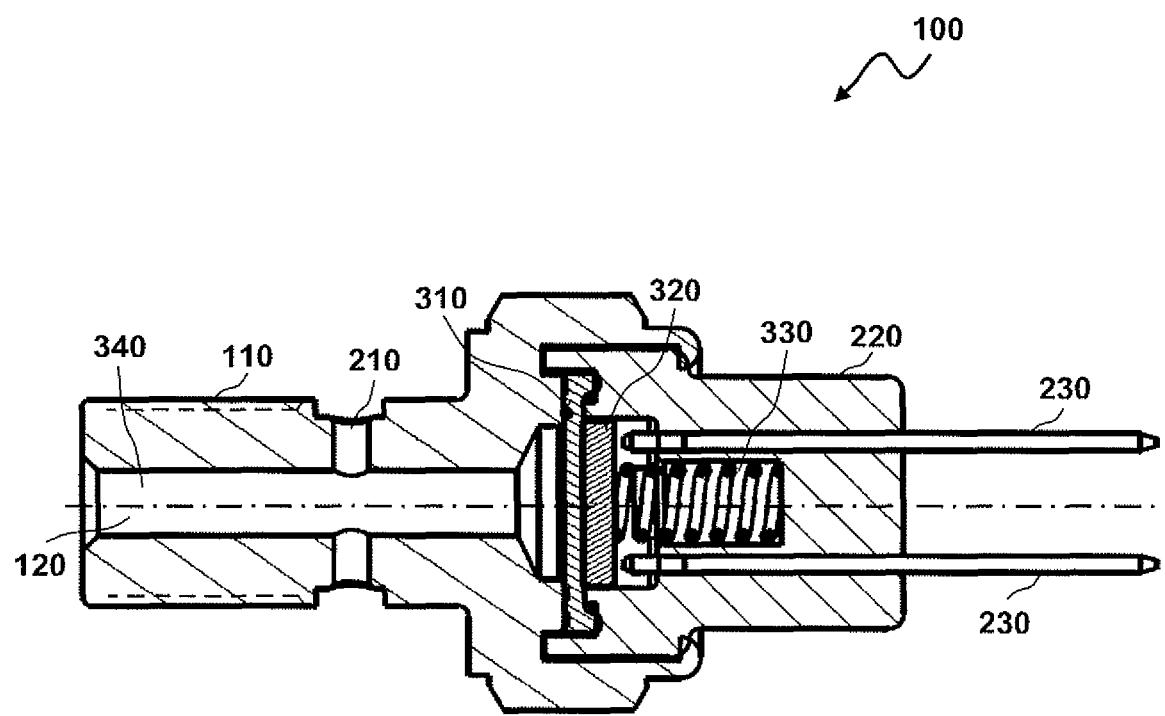
FIG. 3 illustrates a cross-sectional view of the pressure switch as shown in FIG. 1 along line A-A, in accordance with a preferred embodiment.

FIG. 1 illustrates a top plan view of a pressure switch 100, in which embodiments of the present invention may be implemented. The pressure switch 100 can, for example, function as a brake switch. The pressure switch 100 is normally an open switch for switching an automobile brake system (not shown) based on the level of pressure media 340 (as shown in FIG. 3) such as air or gas, which surrounds the pressure switch 100. Note that the embodiments discussed can be utilized in the context of a wide variety of automotive systems such as automobiles, sports utility vehicles, snowmobiles, etc. It can be appreciated, however, that such embodiments can be implemented in the context of other systems and designs, and are not limited to the automotive field. The discussion of automobile braking systems, as utilized herein, is presented for general illustrative purposes only.

The pressure switch 100 closes or opens electrical connections (not shown) when the pressure is above or below a certain preset threshold. The pressure switch 100 includes a banjo housing 110, which includes a central hollow tube 120, as shown in FIG. 1, adapted for providing a passage through which the pressure media 340 can pass.

Figure 2:
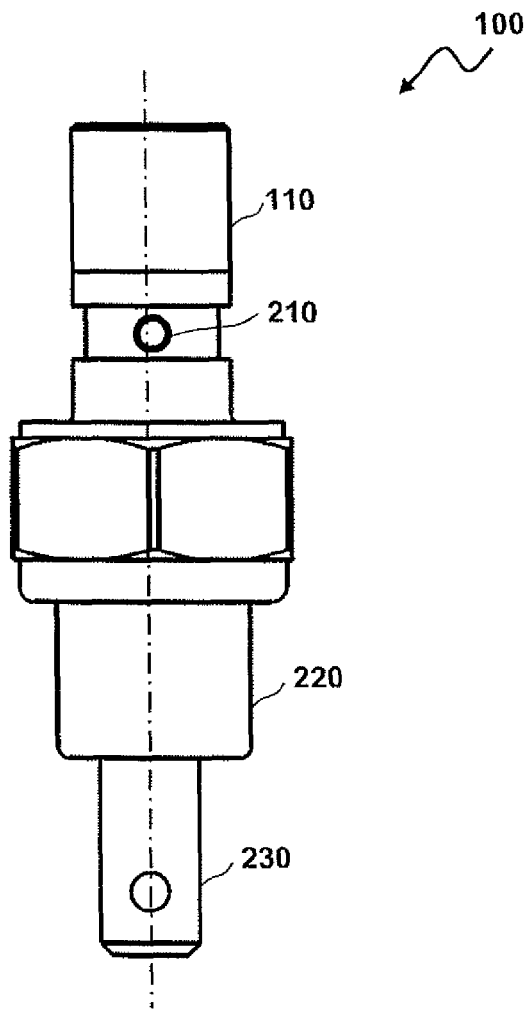
FIG. 2 illustrates a perspective view of the pressure switch as shown in FIG. 1, in which embodiments of the present invention may be implemented.

FIG. 2 illustrates a perspective view of the pressure switch 100, as shown in FIG. 1, in which embodiments of the present invention may be implemented. Note that in FIGS. 1-13 identical parts or elements are generally indicated by identical reference numerals. The pressure switch 100 also includes a cover assembly 220, and a pair of electrical terminals 230 that are partially covered by the cover assembly 220. The pressure switch 100 can be directly mounted in-line, in some embodiments, for example, to a hydraulic circuit (not shown) by utilizing the pair of electrical terminals 230. The banjo housing 110 can include a through hole 210, which is provided for free flowing of the pressure media 340 into the central hollow tube 120, as shown in FIG. 1, of the banjo housing.

FIG. 3 illustrates a cross-sectional view of the pressure switch 100, as shown in FIG. 1 along line A-A, in accordance with a preferred embodiment. As indicated in FIG. 3, the pressure switch 100 can include a self-sealing diaphragm 310, a contact disk 320 and a spring 330, which are arranged within the cover assembly 220. The cover assembly 220 can internally be connected with the banjo housing 110 such that the diaphragm 310, the contact disk 320 and the spring 330 are entirely enclosed by the banjo housing 110. The spring 330 can be made of stainless steel with a high modulus of rigidity. Additionally, the banjo housing 110 can be positioned directly on the diaphragm 310 in such a manner that the pressure media 340 in the central hollow tube 120 are fully enforced on the diaphragm 310.

In addition, the diaphragm 310 can preferably be provided with a flexible membrane, which deflects down onto a rigid area of the contact disk 320 when the pressure is high. Initially, the pressure switch 100 is in open state, (i.e. switch-off state), if the pressure level of the media 340 in the hollow tube 120 is maintained at a preset pressure level. Then, the diaphragm 310 can be deflected down onto the surface of the contact disk 320, when the pressure level of the media 340 is higher than the preset pressure level.

Thereafter, the contact disk 320 can compress the spring to contact the electrical terminals 230, where the pressure switch 100 is in a switch-on state. The pressure switch 100 can, thus, be switched-on for actuating a brake light or any other component related to the brake circuit. Similarly, the pressure switch 100 can return to the switch-off state when the pressure level of the media 340 reaches the preset pressure level. The pressure switch 100 can be mounted in almost any system with less moving parts and without additional hardware. Therefore, such pressure switch 100 can be manufactured at low cost.

Figure 4:
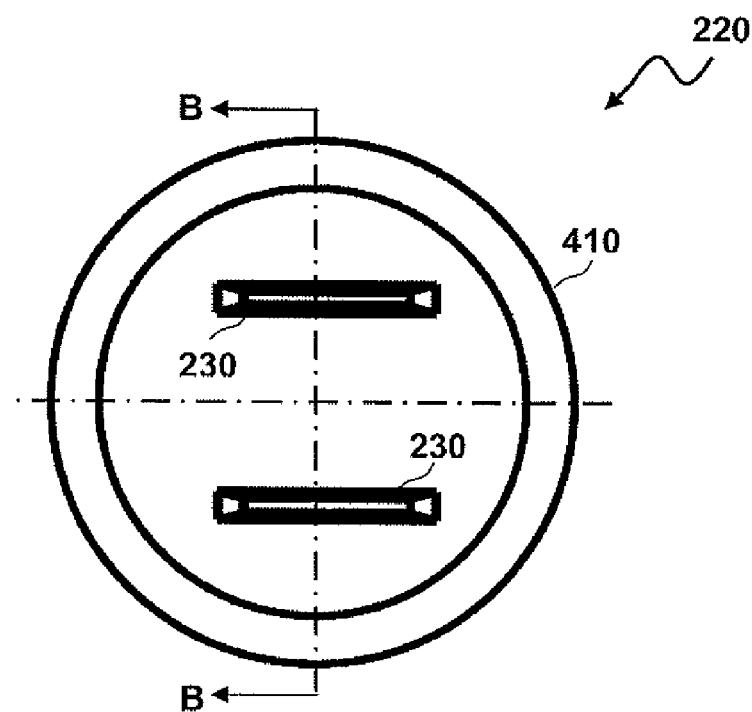
FIG. 4 illustrates a perspective bottom view of a cover assembly of the pressure switch as shown in FIG. 1, in accordance with a preferred embodiment.
Figure 5:
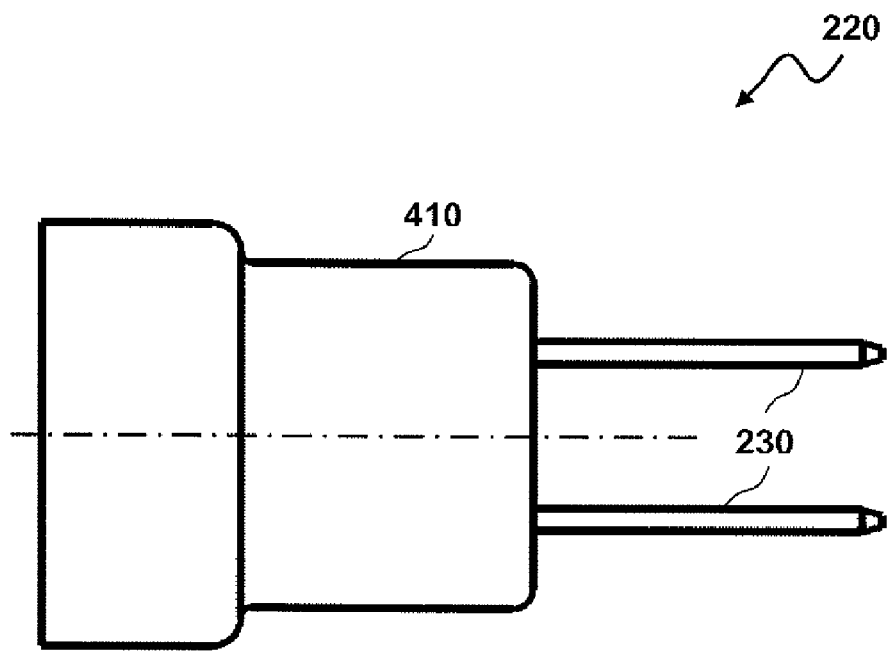
FIG. 5 illustrates a schematic side view of the cover assembly as shown in FIG. 4, in accordance with a preferred embodiment.

FIG. 4 illustrates a perspective bottom view of a cover assembly 220 of the pressure switch 100, as shown in FIG. 1, in accordance with a preferred embodiment. The cover assembly 220 generally includes a pair of electrical terminals 230, through which electrical connection can be made, for example, to a hydraulic circuit (not shown) or another device or component requiring the use of a pressure switch. The cover assembly 220 can include a cover 410, which can be configured from an insulating material formulated, for example, with a unique rapid crystallization system. The cover 410 can be manufactured in any shape, such as, for example, rectangular, square or circular. The cover assembly 220 is sized large enough to fit various components of the pressure switch 100 illustrated in FIG. 5.

Figure 6:
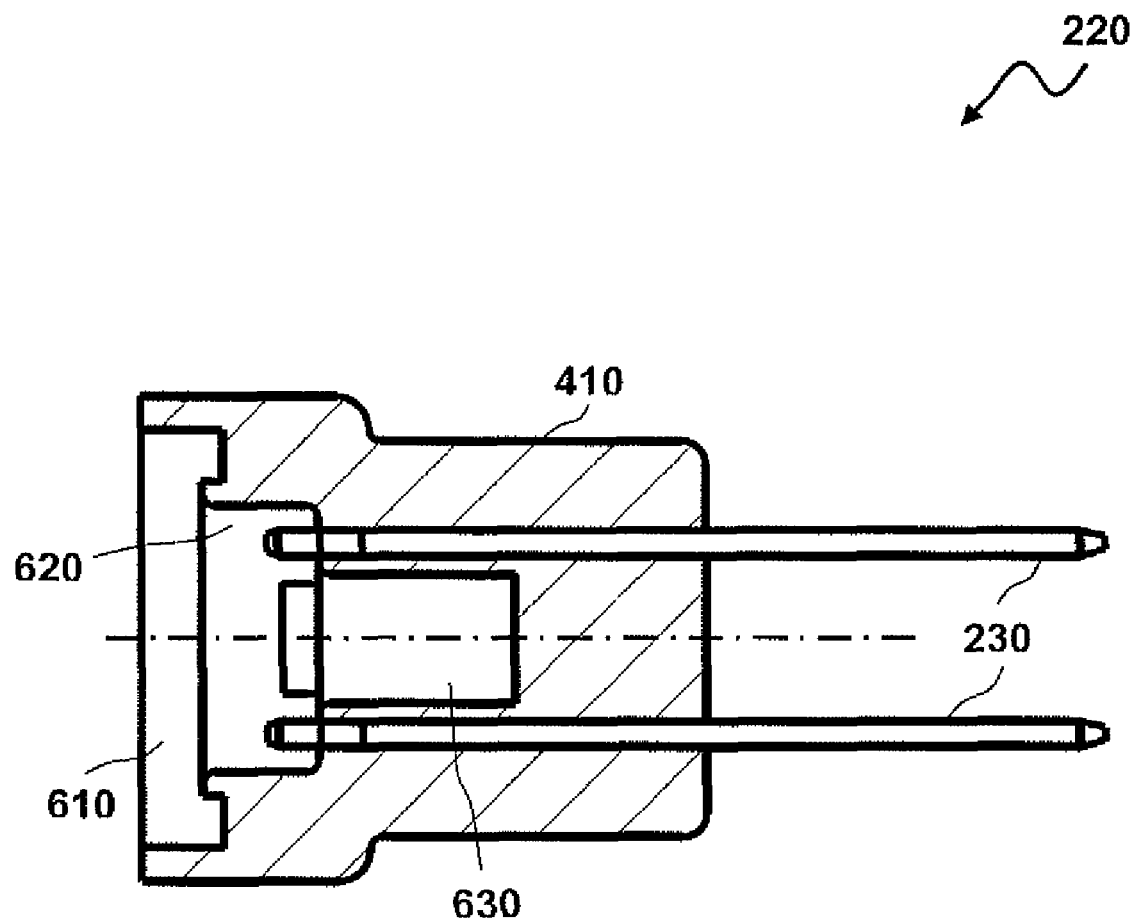
FIG. 6 illustrates a cross-sectional view of the cover assembly as shown in FIG. 4 along line B-B, in accordance with a preferred embodiment.

FIG. 6 illustrates a cross-sectional view of the cover assembly 220, as shown in FIG. 4 along line B-B, in accordance with a preferred embodiment. The cover 410 can be formed with a diaphragm receiving portion 610, a contact disk receiving portion 620 and a spring receiving portion 630. Each portion is correctly dimensioned based on the size of the corresponding components, such as the diaphragm 310, the contact disk 320 and the spring 330, of the pressure switch 100. The cover 410 can be made of a standard size to fit several shapes and sizes of the pressure switch components. The electrical terminals 230 can be inserted up to the contact disk receiving portion 620 of the cover 410 such that the contact disk 320 easily touches one of the ends of the electrical terminals 230 as shown in FIG. 6. These electrical terminals 230 can be spaced apart from each other at a suitable distance.

Figure 7:
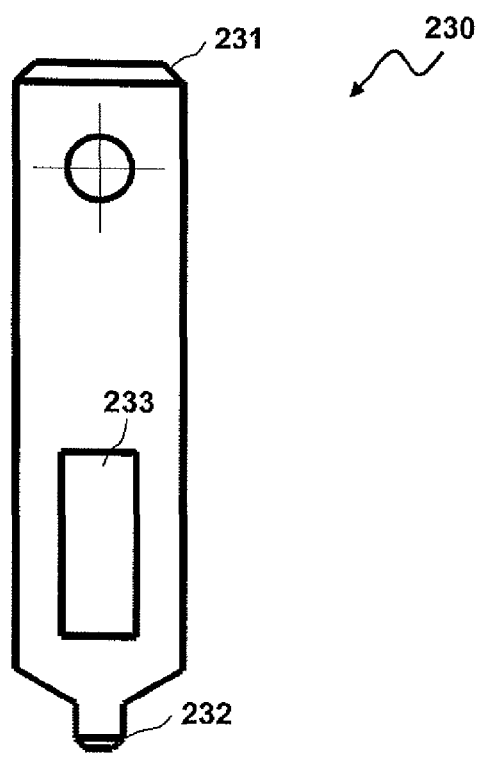
FIG. 7 illustrates a perspective view of electrical terminals of the pressure switch as shown in FIG. 1, in accordance with a preferred embodiment.
Figure 8:
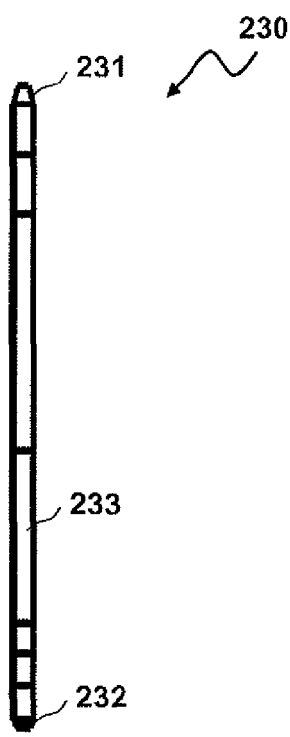
FIG. 8 illustrates a side view of the electrical terminals as shown in FIG. 7, in accordance with a preferred embodiment.

FIGS. 7-8 illustrate a perspective and side view of electrical terminals 230 of the pressure switch 100, as shown in FIG. 1, in accordance with a preferred embodiment. The electrical terminal 230 comprises a tip part 231, a contacting part 232 and a hole 233. The tip part 231 of the terminal 230 can be directly connected to the circuit terminal (not shown). The contacting part 232 can be utilized for contacting the contact disk 320 upon applying high pressure on the central hollow tube 120 of the banjo housing 110. The hole 233 can be configured adjacent to the contacting part 232 in order to effectively fix the terminal 230 to the cover assembly 220. The electrical terminal 230 may be shaped as a rectangular bar. The terminal 230 can be made of cold rolled full hard materials, such as, for example, electrolytic tough pitch (ETP) copper. Finally, the electrical terminal 230 is finished with a coat of silver plate in order to provide a high electrical conductivity property.

Figure 9:
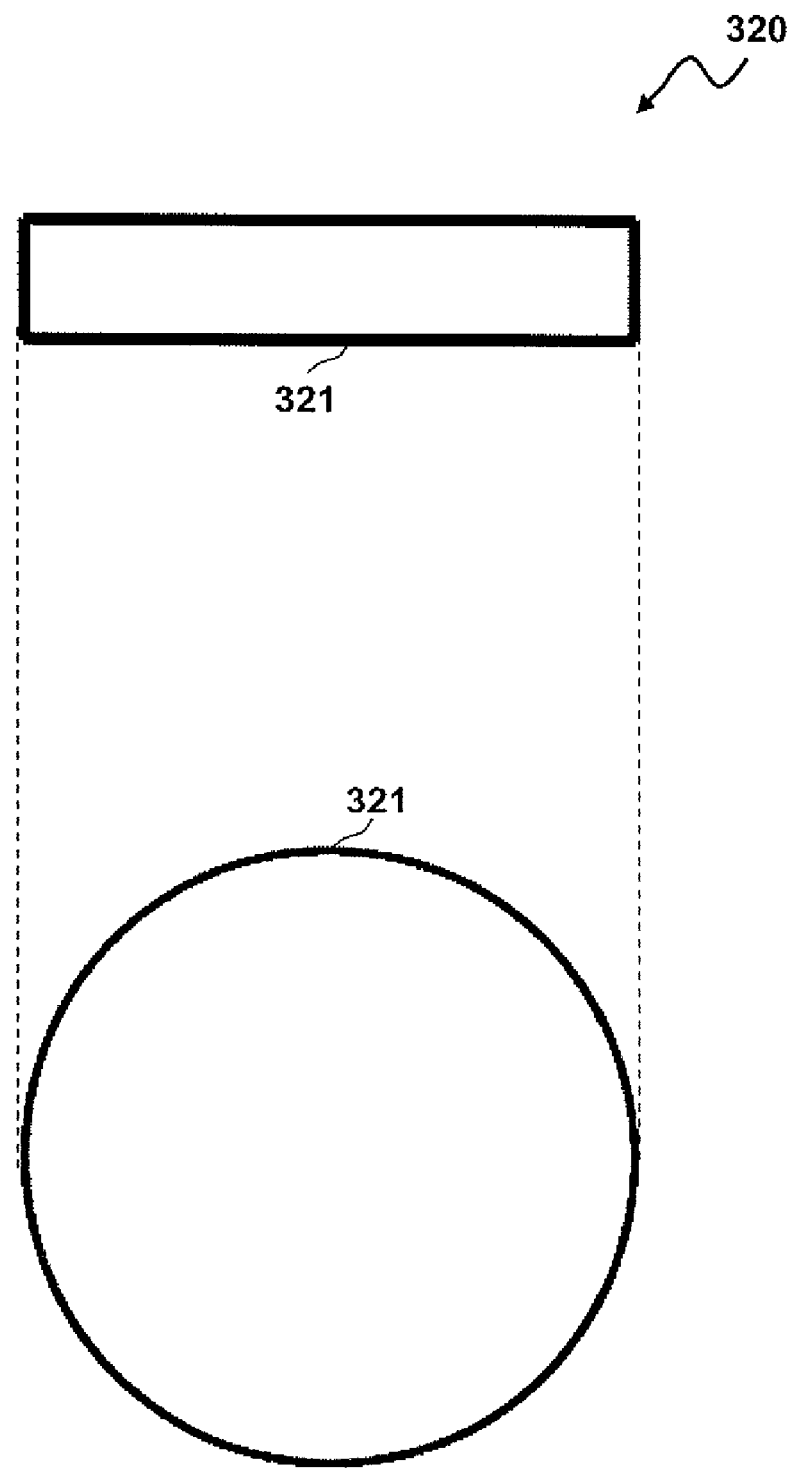
FIG. 9 illustrates a schematic diagram of a contact disk of the pressure switch as shown in FIG. 1, in accordance with a preferred embodiment.

FIG. 9 illustrates a schematic diagram of the contact disk 320 of the pressure switch 100, as shown in FIG. 1, in accordance with a preferred embodiment. The contact disk 320 can be shaped in a circular manner, especially in button-like manner, depending upon design considerations. It can be appreciated, of course, that other shapes may be utilized to implement the contact disk 320. The contact disk 320 includes an outer surface 321 that is finely finished with a silver plate. The plating of silver can be deposited or plated by means of a chemical, electrical, mechanical, or metallurgical process, or by means of a combination of any of these processes.

Further, the contact disk 320 can bias itself when the disk 320 makes contact on the top of the electrical terminals 230, which creates a movement of the disk 320 to provide a self cleaning feature. Therefore, the contact disk 320 is acted as offset contacts with the self-cleaning feature, since the terminals 230 are offset from the center of the switch 100 by 0.015. The contact disk 320 is disposed adjacent to the diaphragm 310. The contact disk 320 can be movable in response to movement of the diaphragm 310 due to pressure changes in the central hollow tube 120 of the banjo housing 110 in such a manner that the contact disk 320 contacts the electrical terminals 230 to complete the circuit (not shown).

Figure 10:
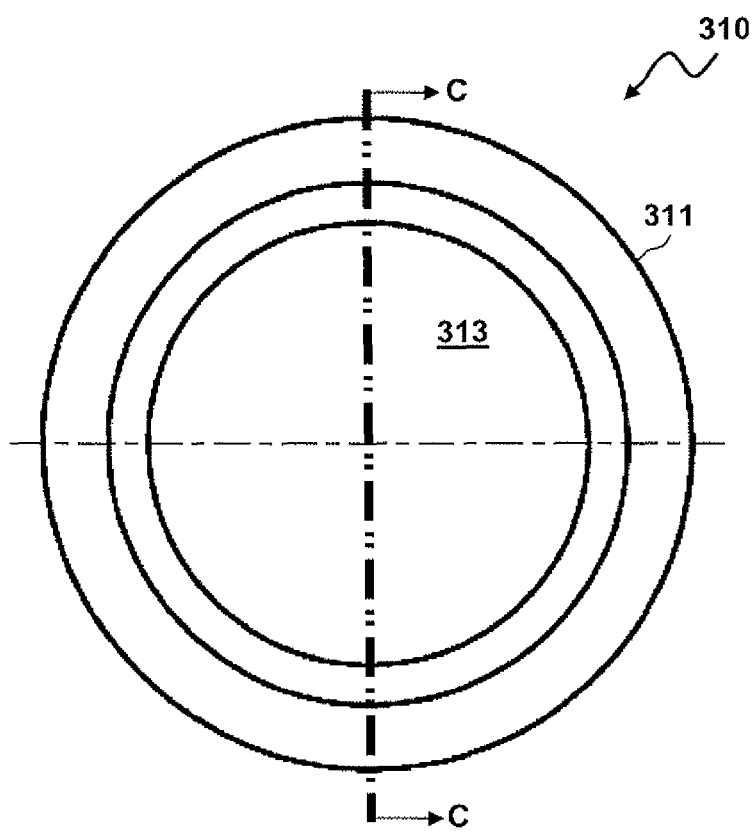
FIG. 10 illustrates a schematic diagram of a diaphragm of the pressure switch as shown in FIG. 1, in accordance with a preferred embodiment.
Figure 11:
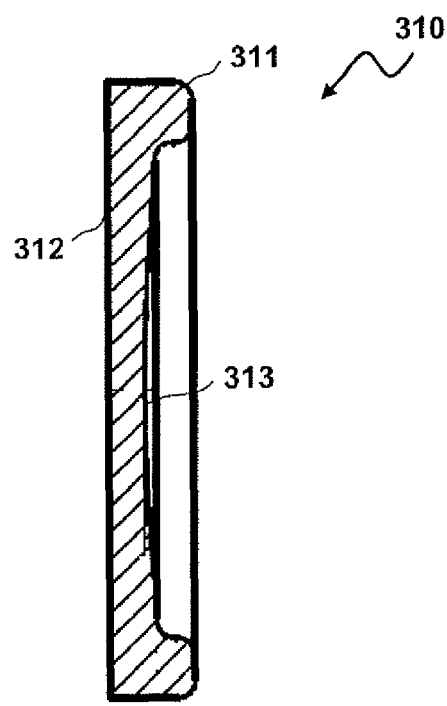
FIG. 11 illustrates a cross-sectional view of the diaphragm as shown in FIG. 10 along line C-C, in accordance with a preferred embodiment.

FIGS. 10-11 illustrate a schematic diagram and a cross-sectional view of a diaphragm 310 of the pressure switch 100, as shown in FIG. 1, in accordance with a preferred embodiment. Note that in FIGS. 1-13 identical parts or elements are generally indicated by identical reference numerals. The diaphragm 310 can be configured from a high tensile elastomer, such as, for example, DiaCom® EPDM (Ethylene Propylene Diene Monomer) rubber.

Additionally, the diaphragm 310 can be displaced such that the pressurized media 340 within the hollow tube 120 of the banjo housing 110 can exert a force on the outer surface 312 of the diaphragm 310. The diaphragm 310 is in pre-set convex shape with a convolution displaced from an outer line thereof. Employment of such convolution substantially negates the possibility of buckling in the generally smooth convex diaphragm 310 and thus allows minimization of material to meet strength requirements.

In operation, the diaphragm 310 can be subjected to deflection on the contact disk 320, when the pressure of the media 340 is above a predetermined level. The contact disk 320 can contact the electrical terminals 230 by compressing the spring 330 due to the deflection of the diaphragm 310 for energizing the circuit, since the contact disk 320 is operatively associated with movement of the diaphragm 310. Similarly, the diaphragm 310 and the contact disk 320 can return to its pre-set position, i.e. switch-off state, when the pressure in the hollow tube 120 drops to the predetermined level.

Figure 12:
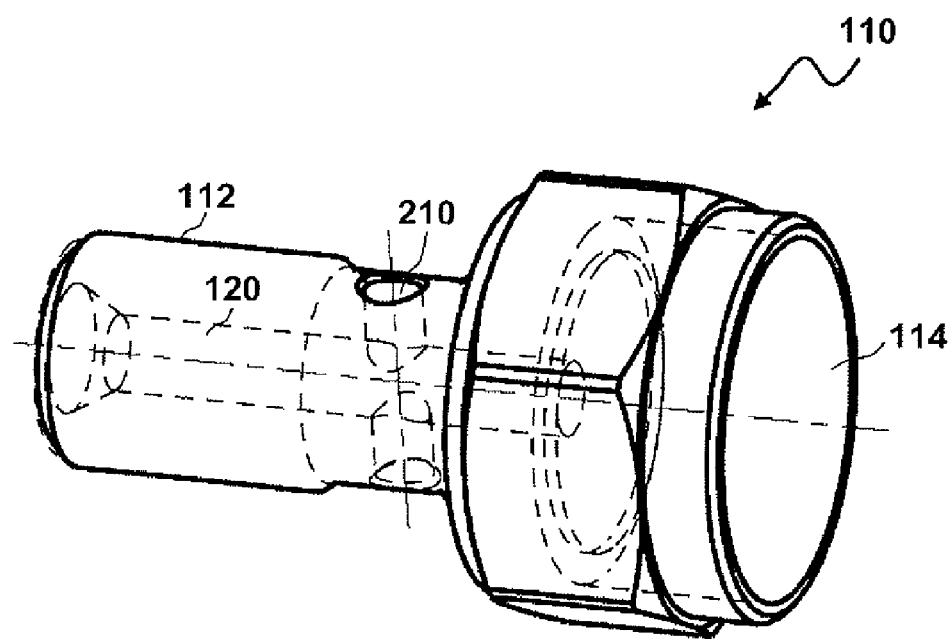
FIG. 12 illustrates a schematic view of a banjo housing of the pressure switch as shown in FIG. 1, in accordance with a preferred embodiment.
Figure 13:
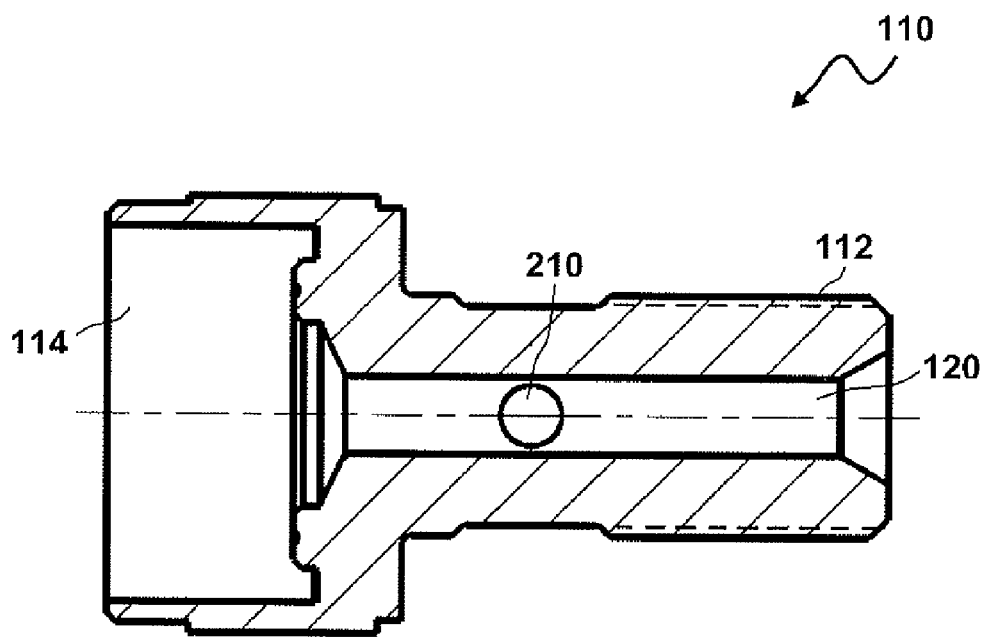
FIG. 13 illustrates a cross-sectional view of the banjo housing as shown in FIG. 12, in accordance with a preferred embodiment.

FIGS. 12-13 illustrate a schematic and cross-sectional view of a banjo housing 110 of the pressure switch 100, as shown in FIG. 1, in accordance with a preferred embodiment. The housing 110 can resemble a banjo, so that it is often referred to as a banjo housing. The banjo housing 110 includes a thread 112, a hollow receiving portion 114, a central hollow tube 120, and a through hole 210. The central hollow tube 120 and the through hole 210 are structured in such a manner that the pressure media 340 can pass through thereon. The thread 112 can be provided on top, especially on the outer surface of the banjo housing 110. The hollow receiving portion 114 may be adapted for receiving the cover assembly 220, which includes the diaphragm 310, the contact disk 320, the spring 330 and the electrical terminals 230. The banjo housing 110 can be configured to include a metal body, such as, for example, cold roll steel material. The banjo housing 110 can be further finished finely with zinc plate, which is chromated with trivalent clear chromate. It can be appreciated, of course, that other types of plating materials may be utilized in place of the zinc plating of the banjo housing, depending upon design considerations.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A low cost, self-cleaning pressure switch apparatus, comprising:
   a plurality of electrical terminals, a cover assembly adapted for partially covering said plurality of electrical terminals, at least one spring placed within said cover assembly, and a contact disk closely disposed on top of said at least one spring, wherein said spring and said contact disk are associated with said cover assembly;
   a diaphragm deflected down onto said contact disk, when a pressure media exceeds a predetermined pressure level, such that said contact disk contacts said plurality of electrical terminals; and
   a banjo housing adapted for completely enclosing said diaphragm, said contact disk and said at least one spring, wherein said contact disk biases itself when said contact disk contacts said plurality of electrical terminals in order to create a movement of said contact disk for achieving a self cleaning feature.

2. The apparatus of claim 1 wherein said plurality of electrical terminals is activated for energizing a hydraulic circuit, when said contact disk contacts said plurality of electrical terminals.

3. The apparatus of claim 1 wherein said banjo housing further comprises at least one through hole and at least one central hollow tube, through which said pressure media contact said diaphragm.

4. The apparatus of claim 2 wherein said pressure switch is mounted in-line to said hydraulic circuit.

5. The apparatus of claim 1 wherein said pressure switch acts as a brake switch of an automobile brake system.

6. The apparatus of claim 1 wherein said pressure switch is adapted for use with an automotive sports vehicle.

7. The apparatus of claim 1 wherein said central hollow tube is displaced over said diaphragm in such a manner that said pressure media directly touches said diaphragm.

8. The apparatus of claim 1 wherein:
said plurality of electrical terminals is activated for energizing a hydraulic circuit, when said contact disk contacts said plurality of electrical terminals; and
said banjo housing further comprises at least one through hole and at least one central hollow tube, through which said pressure media contact said diaphragm.

9. A low cost, self-cleaning pressure switch apparatus, comprising:
a plurality of electrical terminals, a cover assembly adapted for partially covering said plurality of electrical terminals, at least one spring placed within said cover assembly, and a contact disk closely disposed on top of said at least one spring, wherein said spring and said contact disk are associated with said cover assembly;
a diaphragm deflected down onto said contact disk, when a pressure media exceeds a predetermined pressure level, such that said contact disk contacts said plurality of electrical terminals; and
a banjo housing adapted for completely enclosing said diaphragm, said contact disk and said at least one spring, wherein said contact disk biases itself when said contact disk contacts said plurality of electrical terminals in order to create a movement of said contact disk for achieving a self cleaning feature, wherein said plurality of electrical terminals is activated for energizing a hydraulic circuit, when said contact disk contacts said plurality of electrical terminals.

10. The apparatus of claim 9 wherein:
said banjo housing further comprises at least one through hole and at least one central hollow tube, through which said pressure media contact said diaphragm.

11. The apparatus of claim 10 wherein said pressure switch is mounted in-line to said hydraulic circuit.

12. The apparatus of claim 10 wherein said pressure switch acts as a brake switch of an automobile brake system.

13. The apparatus of claim 10 wherein said central hollow tube is displaced over said diaphragm in such a manner that said pressure media directly touches said diaphragm.

14. A method of forming a low cost, self-cleaning pressure switch apparatus, comprising:
providing a plurality of electrical terminals;
adapting a cover assembly for partially covering said plurality of electrical terminals;
placing at least one spring within said cover assembly;
disposing a contact disk closely on top of said at least one spring, wherein said spring and said contact disk are associated with said cover assembly;
deflecting a diaphragm down onto said contact disk, when a pressure media exceeds a predetermined pressure level, such that said contact disk contacts said plurality of electrical terminals; and
adapting a banjo housing for completely enclosing said diaphragm, said contact disk and said at least one spring, wherein said contact disk biases itself when said contact disk contacts said plurality of electrical terminals in order to create a movement of said contact disk for achieving a self cleaning feature.

15. The method of claim 14 wherein said plurality of electrical terminals is activated for energizing a hydraulic circuit, when said contact disk contacts said plurality of electrical terminals.

16. The method of claim 14 further comprising configuring said banjo housing to further comprise at least one through hole and at least one central hollow tube, through which said pressure media contact said diaphragm.

17. The method of claim 14 further comprising mounting said pressure switch in-line to said hydraulic circuit.

18. The method of claim 14 wherein said pressure switch acts as a brake switch of an automobile brake system.

19. The method of claim 14 further comprising displacing said central hollow tube over said diaphragm in such a manner that said pressure media directly touches said diaphragm.

20. The method of claim 14 further comprising:
configuring said banjo housing to further comprise at least one through hole and at least one central hollow tube, through which said pressure media contact said diaphragm;
mounting said pressure switch in-line to said hydraulic circuit; and
displacing said central hollow tube over said diaphragm in such a manner that said pressure media directly touches said diaphragm.

* * * * *